United States Patent
Hamzy

(12)
(10) Patent No.: US 6,623,527 B1
(45) Date of Patent: Sep. 23, 2003

(54) METHOD FOR PROVIDING A DOCUMENT WITH A BUTTON FOR A NETWORK SERVICE

(75) Inventor: Mark J. Hamzy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 08/974,575

(22) Filed: Nov. 19, 1997

(51) Int. Cl.[7] .................................................. G06F 7/00
(52) U.S. Cl. ...................................................... 715/513
(58) Field of Search ................................ 707/501, 513; 709/203; 345/760

(56) References Cited

U.S. PATENT DOCUMENTS

| | | | |
|---|---|---|---|
| 5,083,262 A | | 1/1992 | Haff, Jr. ................. 395/500.48 |
| 5,276,879 A | * | 1/1994 | Barry et al. ................. 709/106 |
| 5,341,293 A | * | 8/1994 | Vertelney et al. ........... 707/530 |
| 5,689,642 A | * | 11/1997 | Harkins et al. ............. 709/207 |
| 5,845,076 A | * | 12/1998 | Arakawa ..................... 709/203 |
| 5,861,883 A | * | 1/1999 | Cuomo et al. ............... 345/326 |
| 5,894,554 A | * | 4/1999 | Lowery et al. ............. 709/203 |
| 5,901,286 A | * | 5/1999 | Danknick et al. ........... 709/203 |
| 5,935,207 A | * | 8/1999 | Logue et al. ................ 709/219 |
| 5,946,458 A | * | 8/1999 | Austin et al. ............... 358/1.15 |
| 5,974,441 A | * | 10/1999 | Rogers et al. ............... 709/200 |
| 6,006,281 A | * | 12/1999 | Edmunds ........................ 710/1 |
| 6,020,973 A | * | 2/2000 | Levine et al. ............... 358/1.15 |

FOREIGN PATENT DOCUMENTS

JP          10-133973          5/1998

OTHER PUBLICATIONS

JavaScript, Lemay et al., Sams.net Publishing, pp. 6–9, 1996.*

Timothy W. Bickmore, Bill N. Schilit, Digestor: Device–Independnet Acccess To The World Wide Web, http://www.fxpal.xerox.com/papers/bic97, pp. 8.

Internet Printing, M. Armon Rahgozar, Tom Hastings and Daniel L. McCue, SPIE vol. 3018, pp. 212–223.

* cited by examiner

Primary Examiner—Heather R. Herndon
Assistant Examiner—Cesar B. Paula
(74) Attorney, Agent, or Firm—Jeffrey S. LaBaw

(57) ABSTRACT

A document written in a markup language is intercepted and a markup language string inserted. When read by a browser which understands the markup language, a modified document is presented incorporating a button for a network service such as printing. The inserted markup language used to present the button also includes a path to a server to perform a network service related to the modified document.

56 Claims, 5 Drawing Sheets

METHOD FOR PROVIDING A DOCUMENT WITH A BUTTON FOR A NETWORK SERVICE

BACKGROUND OF THE INVENTION

This invention relates generally to information handling in a computer network. More particularly, it relates to providing a browser network service support, e.g., printing, in a computer network such as an intranet or Internet environment.

It is well known to couple computer systems in a computer network so that the system resources attached to respective systems may be shared. Expensive resources such as printers and storage not fully utilized by the single machine to which they are attached can be more productive. By aggregating resources so that they are accessible to all users, each user has access to many more resources than would be economically feasible to provide at each user's desktop.

In recent years, many important developments have been made in network computing. The Internet, and particularly the World Wide Web, has made a vast sea of data accessible to a multitude of users. It has become a cultural fixture in today's society providing both information and entertainment. Government agencies are employing Web sites for informational purposes. Businesses are using the Internet for a variety of commercial efforts. Uniform Resource Locators (URLs) to a company's Web server are frequently part of television, radio or print advertisements. Once equipped with the URL, a consumer can utilize a Web browser which uses the Hypertext Transfer Protocol (HTTP) to retrieve a Web page from the Web server.

If the user is particularly interested in the Web page, he may wish to print the page to retain a permanent copy. If the user device is a personal computer, printing is typically accomplished by the browser requesting a local printer driver to send a local or remote printer a fully rendered version of the Web page. A typical printer driver can require one to two MB of disk space for installation purposes alone. When loaded with its associated system components, i.e. spooling system, raster banding/journaling code, port driver, the printer driver can consume large amounts of system memory. Since each printer driver is generally device specific, a plurality of printer drivers are required. Often each application requires its own set of drivers. Depending on the size of the jobs, number of print jobs and printer languages, the printer subsystem can require hundreds of megabytes of local storage. As one can see, the printer drivers and associated software can take up a significant portion of the system resources. Other services available in the network can require similar expenditures of local resources.

Other recent developments are the availability of inexpensive computers such as the "network computer" and television set top devices such as WebTV. These systems are characterized by little local storage and use the central storage of a network far more extensively than a typical personal computer. To compete effectively on a price basis with their more capable brethren, there is a continual pressure to strip nonessential hardware and software. Thus, the presence of printer drivers are a burden to these systems.

Further, wireless, hand held devices have been devised which are also capable of retrieving Web data. These devices not only have to limit the hardware requirements from a price perspective, but from a space perspective as well. Since these devices are typically smaller than a piece of paper as well as wireless, it is difficult to conveniently connect a separate printer or other device.

One way to alleviate the storage requirements for these devices, would be to limit the users' choices to single compatible printer; the manufacturer of the handheld device would sell one printer that is "hard coded" for the device. In this scenario, if a user did not have that printer already, he would be forced to buy that printer. This approach denies the user the ability to choose his printer or make use of the network printer resources.

Thus, it is desirable to reduce or eliminate the need for a great number of printer drivers and associated resources at the thin clients. Further, it is desirable to allow users full access to the resources available in the network.

SUMMARY OF THE INVENTION

Therefore, it is an object of the invention to print on a network printer from a thin client using a minimum of local resources.

It is another object of the invention to provide network services for web pages from the World Wide Web from a remote computing device.

It is another object of the invention to minimize the local resources devoted to network services from the World Wide Web.

It is another object of the invention to incorporate the print button providing web related network services for client devices.

These and other objects are accomplished by intercepting a document written in a markup language, such as HTML, and inserting a markup language string to create a modified document. When displayed at the client by the browser, a button characterized by the inserted markup language string is presented in the modified document for the network service.

The process begins with the request of a document from a web server by a web client. The requested document is intercepted by an intermediate server, such as a proxy server of the server of an Internet service provider. The intermediate server parses the markup language of the requested document to find an appropriate place to insert the button for a network service such as printing. Next, a markup language string is inserted in the requested document for a print button including a path to a print server to produce a modified document. The modified document is sent to the requesting client. The browser at the client presents the modified document on a display so that the print button is presented in the document. Upon selection of the print button, the client sends a print request to the print server. The document is then printed at a printer associated with the print server.

BRIEF DESCRIPTION OF THE DRAWINGS

These objects, features and advantages will be more readily understood with reference to the attached figures and following description.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system.

Figure 1:
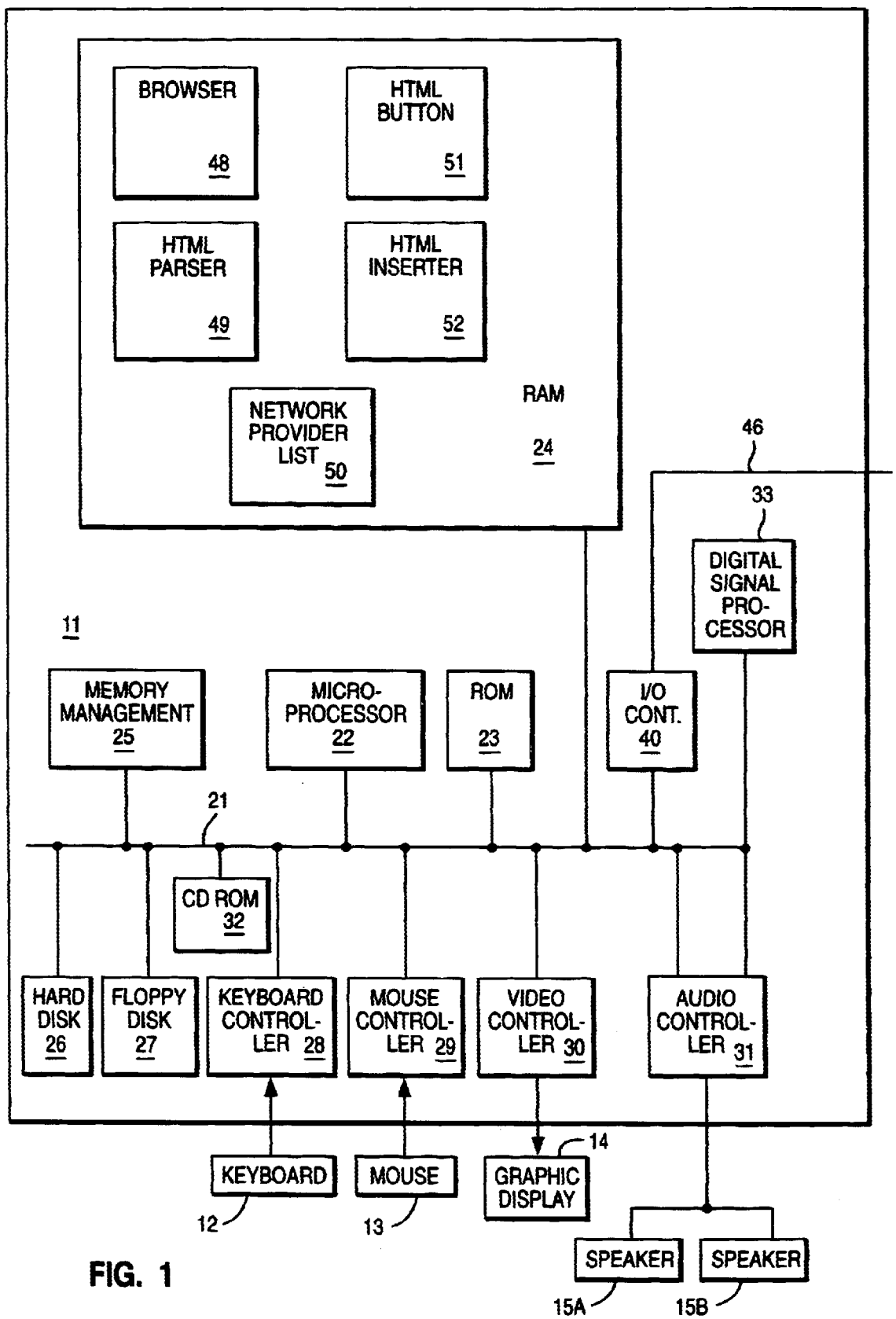
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the types of devices which would benefit from the invention is a wireless device such as a palmtop computer. While many of the components are similar to those described above for a personal computer, albeit smaller in size and capability, these devices are generally connected to a network by cellular or digital transmissions in the RF spectrum, rather than a coax or other type of cable. Other transmission means such as infrared or ultrasound are known to the art, but less commonly used.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted in a computer readable medium over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention. The operations are machine operations processing electrical signals to generate other electrical signals.

Figure 2:
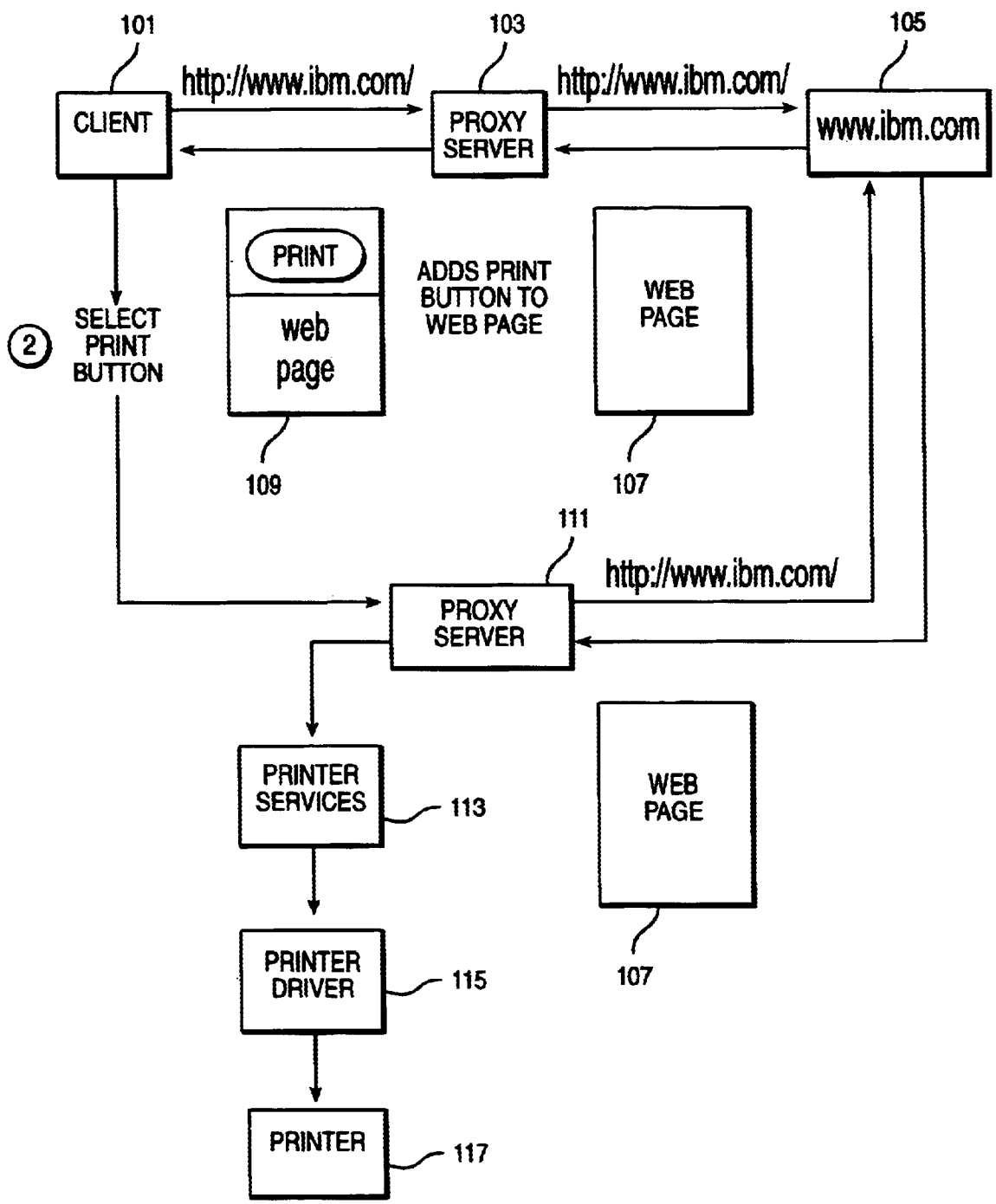
FIG. 2 shows a simplified network configuration in which the invention might be implemented.

FIG. 2 shows a simplified network in which the invention may be implemented. Transactions in the World Wide Web are commonly accomplished by use of a browser such as Netscape Navigator using the Hypertext Transfer Protocol (HTTP) to make requests of Web servers. The browsers read the Hypertext Markup Language (HTML) in which the retrieved files are usually written. Client 101 using a Web browser issues an HTTP GET or POST request for the web page from the web server at a Uniform Resource Locator (URL), e.g., www.ibm.com. A URL identifies the network path to a server by use of a special syntax to define the network connection. This request is handled by a proxy server 103 within an intranet or the server of an intranet service provider (ISP) which forwards the request to the web server whose URL is www.ibm.com. Those skilled in the art would appreciate that there may be many intervening systems between the proxy server and the web server which are not pictured in the figure. Also not pictured are a plurality of web servers which handle requests to a particular URL or a plurality of web clients. The web server with the desired web page sends the page back to the requesting proxy server 103.

At the proxy server 103, the page is modified to include the push button of the present invention. In the case of a web page written in HTML, a short section of HTML is inserted into the page which describes the appearance of the button for the browser to present as well as the action which should be taken if a button is depressed. A gif or other image file in the HTML can be used to describe the button's appearance. The action specified is to send a URL request that is a print request back to the proxy server, or to a dedicated print server, for the page being browsed. As will be described below, the URL request is routed to the proxy server's URL, and also includes the URL of the page to be printed.

The proxy server 111 to which the print request is sent may be the same or a different proxy server from the one which initially intercepted the page. A second request is made to the web server for an unmodified page suitable for printing. Once this page is received, it is sent to the printer or other network services available in the network. As will explained below, some implementations of the invention allow the user the choice of printer services to be used so that the proxy server may route the web page to different destinations depending on the input of the user.

The printer services 113, typically a dedicated printer server for the network, renders the web page into a print job by means of a printer driver for the selected printer. A browser application, either at proxy server 111 or printer services 113, takes the pages and issues a series of graphics device calls to the graphics API layer part of the operating system. This layer translates the graphics device calls into a format understood by the printer driver, preferably a device independent format such as a Graphics Object Content Architecture metafile. Once rendered, the printer services spools the print job in a print spooler queue until the page can be printed by the printer for eventual retrieval by the user. These processes are well known to those skilled in the art and will not be discussed further.

Figure 3:
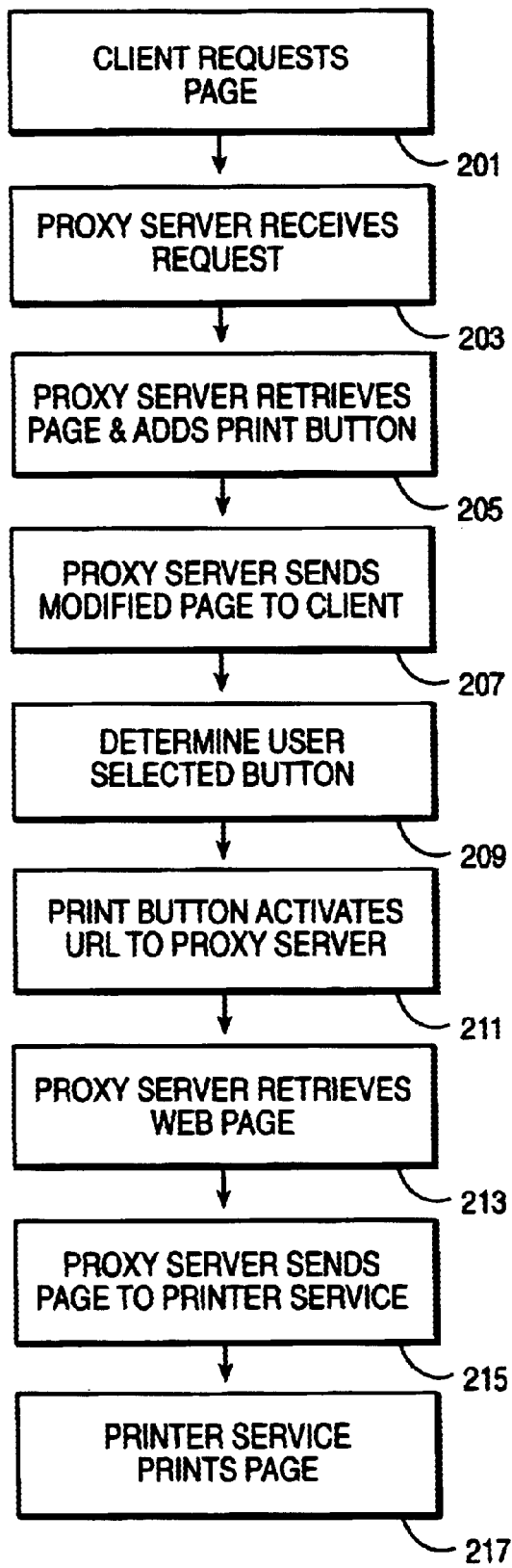
FIG. 3 is a flow diagram of the method of the present invention.

This process outlined above is described in somewhat greater detail with reference to the flow diagram depicted in FIG. 3. In step 201, the browser at the client issues an HTTP request for a Web page. In step 203, this request is intercepted and handled by the proxy server for the intranet or ISP. The proxy server makes the request to the appropriate Web server to retrieve the page. Then, the proxy server adds the HTML necessary for the browser to display the button within the modified page, step 205. This step may optionally include a parsing step to parse the HTML to locate a blank space in the page. The parsing step may also be used to determine the visual characteristics of the page. For example, the gif files of the page can be examined to determine what other buttons on the page look like, so that the print button may either conform with or stand out from the rest of the controls on the Web page. Alternatively, the proxy server can add a standard print button at the top or bottom of the page.

In addition to the HTML for the print button's appearance, the proxy server also inserts the HTML used when a button is selected by the user. The embedded HTML identifies the requested web page, the requesting client and the path to the print server which controls the requested printer. The print button may actually comprise several individual selections or push buttons, each for one of a plurality of printers which may be controlled by the same printer server or different print servers.

The word button is used herein to include any control from which a network service can be selected. The printers selected for presentation in the button pulldown can be dependent on the client's identifying information. For example, it would not be useful to allow a user to choose a printer located in a secure area to which he does not have access. Thus, the printers available for selection by one browser may differ from those available to another. Further, in the case of mobile computers, the selected printers may be changed according to the user's current location, i.e. the printers which are most accessible to the user would be available for selection. A set of user profiles, referred to by table lookup, can be used to select the printers included in the HTML. The user profiles contain lists of printers and their respective print servers, URLs and so forth. The user profiles can be organized into sets of home printers for a preferred set of printers for each user at his home location and a sets of printers based on the user's current location for mobile users.

The proxy server then sends the modified page to the client system in step 207.

Once received at the client, the browser will read the HTML of the page and present it to the user including the print button as well as any text, graphics or video from the original page. Next, the browser waits until the user has taken some action, such as selecting the print button. The act of selecting the button may differ somewhat according to the user system. A network computer or PC will have both a pointing device such as a mouse and a keyboard; selection with those systems is accomplished as is typical through the movement of the pointer cursor and key clicks in the vicinity of the button in the web page. In the case of a handheld device such as a palmtop or a cellular phone with a small screen, the button activation may be accomplished through a touch screen or by depressing keys in a numerical pad. Thus, the presentation of the HTML may differ from device to device.

Assuming that the user has selected the print button, the browser determines that this is so, step 209. Next, the browser refers to the embedded HTML to determine the appropriate action to take, i.e. send a print request including identifying information to the appropriate URL. As mentioned above, the URL will be directed to an appropriate proxy server in the network.

Once the proxy server receives the print request from the client, it makes a new request for the web page to the web server. In an alternative embodiment, a cache is present at the proxy server in which recently requested, unmodified pages are stored. Before a new request is made outside the network, the cache is checked to see if the page is already present. Pages can be flushed from the cache on a FIFO basis or after a predetermined period of time has elapsed from the time when the page was initially cached. Thus, additional overhead to the Internet associated with two requests for the same page is minimized. Checking the cache can be accomplished either internally by the proxy server or within the intranet by the print server depending upon the URL to which the print request was directed.

Once all elements of the page have been retrieved, the web page is sent to the printer service, step 215. As mentioned above, the web page is converted to a set of graphics API calls by a browser application which are subsequently converted to a format understood by the printer drivers. In the printer service, the page is properly formatted, rendered, spooled and sent to the selected printer by the printer drivers. The printer service may have a plurality of different types of printers attached, and thus, have many different types of printer drivers resident. The page is printed by the printer, step 217.

In the preferred embodiment, the modification of the web page occurs at an intermediate system such as the proxy server. In an alternative embodiment, the actual modification can be accomplished at the client system through the use of a "plug-in" or helper application to a browser having a Java Virtual Machine and support for application plug-ins. Plug-ins are a well known means to extend the functionality of a browser. The browser plug-in would be configured at some initial time to retrieve a set of active printers or other network services available at the network. When a page was retrieved by the browser, the interception, parsing and insertion of the HTML text is accomplished locally. The set of active servers could be refreshed periodically, e.g., every week, and/or at logon times to the network. In addition, in the case of printer unavailability, notices can be sent to the clients to delete the printer choice from the currently active list. This alternative method improves the overall performance of the proxy server at the expense of increased use of local resources. Further, if a search means was available in the network for determining network services, but the HTML insertor was not the browser model allows the invention to function in a network which has not been enabled.

An example of the HTML language string that is inserted into the web page data stream is given below:

```
<FORM ACTION="http://print.proxy.ibm.com/print.cgi"
   METHOD="get"><INPUT TYPE=hidden NAME=
   "user" VALUE="bob">
<INPUT TYPE=hidden NAME="place" VALUE="http://
   www.ibm.com/">
<SELECT NAME="printer">
<OPTION VALUE="printer1"> HP Deskjet 680C located at
   901-3H021
<OPTION VALUE="printer2"> Tektronix Phaser 480
   located at 053-5C005
</SELECT>
<INPUT TYPE="Submit" VALUE="Please select location
   to print to:">
</FORM>
<A HREF="http://print.proxy.ibm.com/setup.cgi?user=
   bob">Setup places to print to</A>
```

If the first item is selected in the list box, then the URL that is generated and sent to the proxy is http://print.proxy.ibm.com/print.cgi?user=bob&place= http%3A%2F%2Fwww.ibm.com%2F&printer=printer1

This example provides the HTML needed for a list box with two printer choices and a button to print the page. It also has another button to set the user preferences for printing.

Figure 4A:
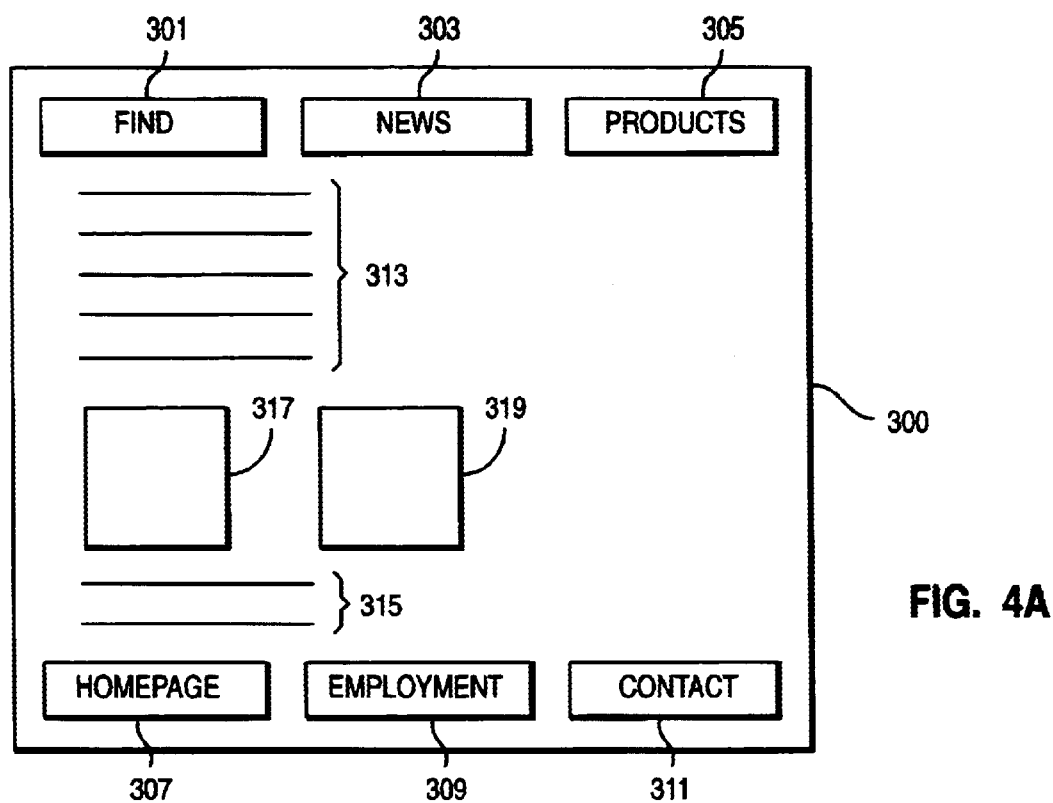
FIGS. 4A and 4B are respectively a before illustration and an after illustration of a Web page modified according to the present invention.
Figure 4B:
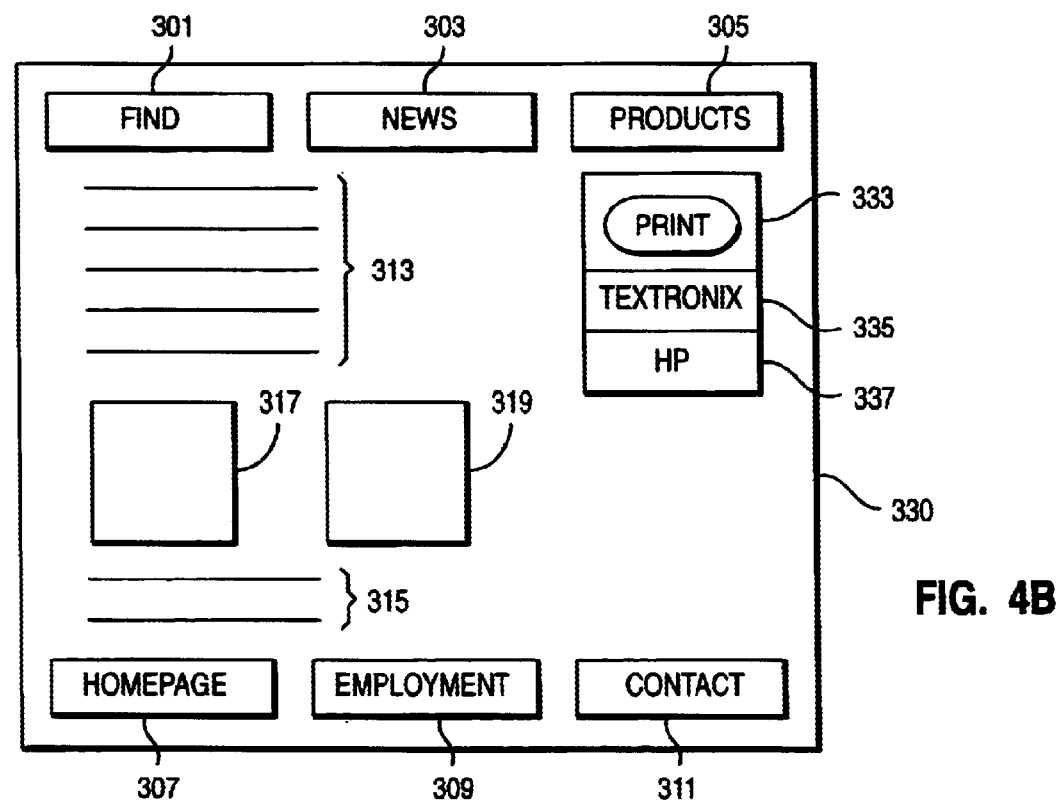

A sample web page before and after modification according to the invention is shown in FIGS. 4A and 4B respectively. In FIG. 4A, the unmodified page is shown. It includes such items as controls 301–307, text 313, 315 and graphic images 317, 319. Each of these items is normally rendered according to the HTML in the web page, some of these items, e.g., graphics 317, 319 may be located at their own URL address, different from that of the page as a whole, and can be retrieved in a separate HTTP request before the page is presented by the browser. In the preferred embodiment of the invention, this page is not shown at the client due to its interception and modification at the proxy server.

In FIG. 4B, the modified web page is shown. The controls 301–307, text 313–315 and graphics 317, 319 are shown as before. Printer button 333 has been added. Two print choices are shown: one for a Tektronix printer 335 and one for an HP printer. Both of these printers are expensive and not likely to be provided to each user of the network. Included in these labels may be instructions for the location of the printer, e.g., building 8, 2nd floor, room 222. This is very useful to the mobile user who is not acquainted with the printer locations of the particular network.

In this illustrative embodiment, a blank space has been located in the page for presentation of the printer button 333. This is accomplished by parsing the HTML of the page and determining a suitable position for insertion of the print button. Alternatively, the printer button may be placed at the top or bottom of the page. Both approaches have their own advantages and disadvantages. Finding a blank space in the page makes it more compact and possibly more aesthetically appealing to the user. It has the drawback of requiring a more extensive parsing step at the proxy server. Attaching the print button to the top or bottom of the page is faster as a very small amount of the HTML in the headers or footers needs to be parsed to correctly insert the print button HTML. It does, however, increase the size of the page which may necessitate scrolling of the page; this may be annoying to the user, particularly given the small screens of many mobile devices. The approaches can be combined. For example, the proxy server searches for a blank space, if one is not found, it inserts the button at the top of the page.

Figure 5A:
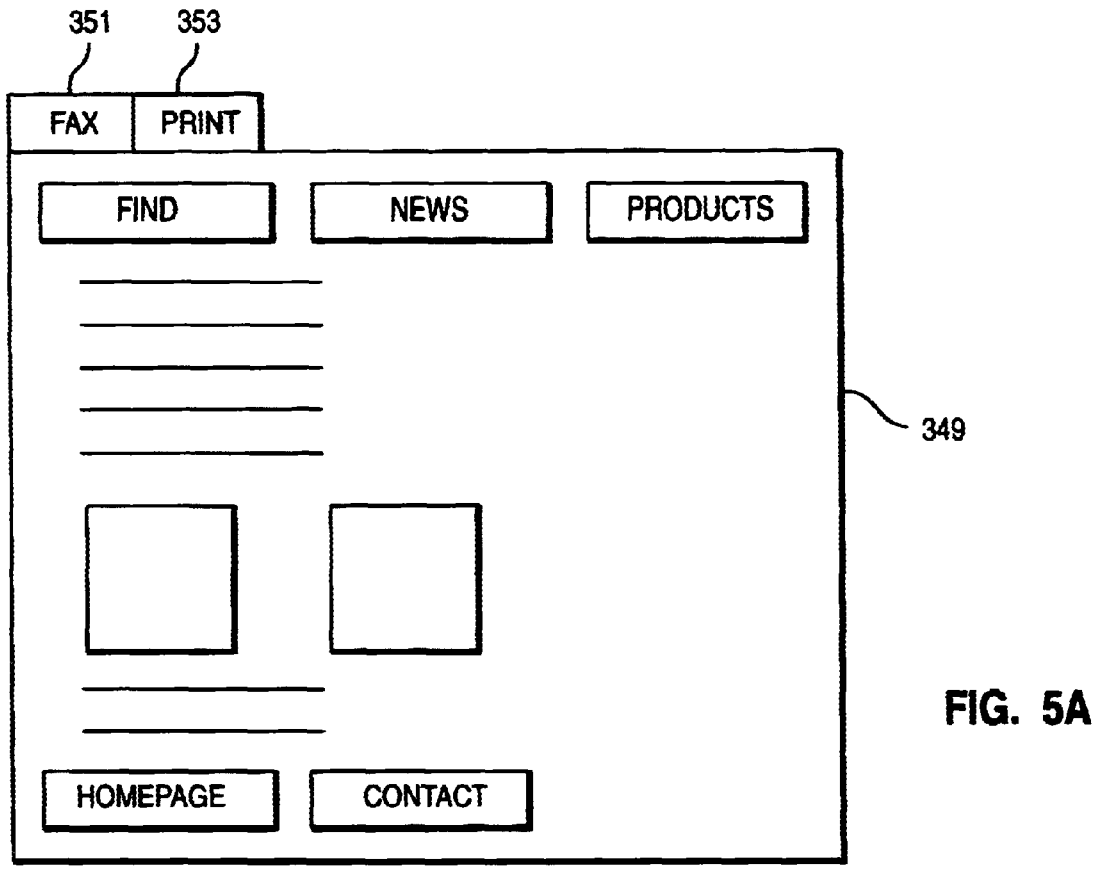
FIG. 5A is an illustration of a web page modified according to the invention.
Figure 5B:
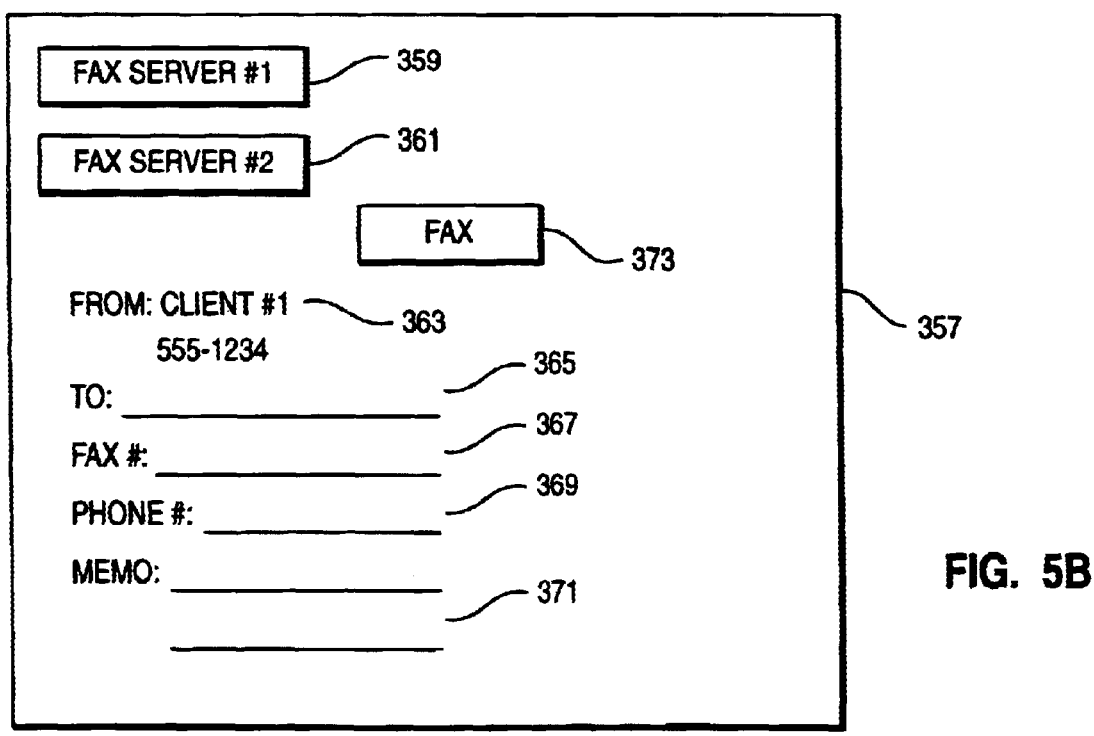
FIG. 5B is an illustration of a secondary web page sent to the client for selection of a network service.

FIG. 5A shows another embodiment of the invention. While the discussion above has concentrated on providing network print services to a browser, other network services unavailable at the local device can be made available. In the figure, two buttons 351 and 352 have been added to the top of the web page 349. Fax button 351 provides access to facsimile services available at a network server. Actuation of the fax button 351 would send an HTTP request to the URL listed in the response HTML associated with the button to a facsimile server rather than a print server, possibly to fax a copy of the web page to a facsimile machine convenient to the user. Print button 352 provides print services as described above. In this example, a default facsimile machine or default printer is used upon actuation of the respective button. The default machines can be assigned by the network administrator or during a set up process initiated by the user.

Alternatively, the actuation of the inserted button 351 could be programmed to make an HTTP request for a new web page, a form page 357 stored at the proxy server. The form page 357 could have button or list box choices 359, 361 for alternative network providers of the network service. Text 363 indicating the origin of the facsimile request can be added by the proxy server from the information contained in the client's original request. Fields 365, 367, 369, 371 for user provided information such as recipient's name, facsimile number and phone number as well as a short memo field are shown on the form. Actuation of the FAX button 373 sends the request for network services to selected proxy server. In constructing the page 357, the proxy server inserts a reference to the original web page so that the selected network service provider will know which page to retrieve and fax to the recipient.

One of the main applications of the invention is for use by web browsing devices that do not have printing capabilities at all, or at best, can only print to a small number of devices. The handheld devices described above are an example. However, any web browser can benefit from using this package; when new printers are added to the network, new printer drivers do not need to be added to user workstations throughout the network. Users who want print services of a server in a local area network, but do not have the full set of network services can use the present invention to print.

Other examples of devices that have a web browser which could use the present invention include: cellular phones, palmtop computers, laptop computers, kiosk stations, network computers, Java Stations, and even network connected personal computers. Printing can be a service provided by the ISP. In certain networks, such as a network of television set top boxes such as WebTV, users do not have the capability to print. Thus, there is no provision in these browsers for the user selection of a printer to which to print. The ISP can alter the page, adding the print button of the present invention. When the user selects the print button, the ISP prints the requested web page and mails it to the user. A similar facsimile service would also be possible by the addition of a fax button to the page. The ISP could charge both the user and the advertiser for the service.

When a web page is viewed on a small text screen, the web page looks simple. However, when the page is printed, the page may be much richer in detail as the printer is typically much more capable than most displays. This is particularly true in the case of a monochrome display in a hand held device.

For example:

1) The page size is 8 ½"×11" vs. 80 columns×25 rows
2) 16 million colors from the color print cartridges vs. monochrome display.

The printed web page is not limited to the capabilities of the display. It can take full advantage of the resolution of the target printer.

Although facsimile and printing have been given as illustrative examples of network services which can be provided by means of the present invention, other network services such as archival of web pages at a server can be made available. The examples given should be in no way limiting to the scope of the invention.

Programs used to present and understand HTML pages are generally called browsers; many browsers have much more limited capabilities than the well known Netscape Navigator program. While the use of HTML is popular in the World Wide Web today, browsers of the future will understand other markup languages such XML and dynamic HTML. Other protocols than HTTP may be used to retrieve web pages. Thus, the use of HTML or HTTP is not required by the invention. The language of the inserted button and the protocol which it invokes must simply be understood by the browser.

As used herein, "Web client" should be broadly construed to mean any computer or component thereof connectable in any known or later developed manner to a computer network, such as the Internet, which requests services from another entity in the network. The term "Web server" should also be broadly construed to mean a computer or component thereof connectable to the Internet, or other network, which provides services to requesting web clients in the network.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

I claim:

1. A method for printing a document in a markup language, comprising the steps of:
    requesting a document from a web server by a web client;
    intercepting the requested document by an intermediate server;
    parsing the markup language of the requested document;
    inserting a markup language string in the requested document for a print button, including a path to a print server, to produce a modified document;
    sending the modified document to the requesting client;
    presenting the modified document at the requesting client on a display, including presenting the print button;
    responsive to selection of the print button, sending a print request to the print server; and
    printing the requested document at a printer associated with the print server.

2. The method as recited in claim 1 wherein the print button contains a list of selectable printers and further comprises the step of detecting which printer was selected by a user.

3. The method as recited in claim 1 wherein the inserted markup language string includes code for the appearance of the print button and code for an action which results from activation of the print button.

4. The method as recited in claim 3 wherein the parsing step includes the step of parsing for the appearance of controls in the requested document and the method further comprises the step of changing the code for the appearance of the print button so that the print button will resemble the controls in the requested document.

5. The method as recited in claim 4 wherein the parsing step includes the step of parsing for the appearance of controls in the requested document and the method further comprises the steps of:
    evaluating the code for the appearance of the print button for similarity to controls in the requested document; and
    if needed, adjusting the code for the appearance of the print button so that the print button will stand out from the controls in the requested document.

6. The method as recited in claim 1 wherein the intermediate server has a cache for recently requested documents and the method further comprises the steps of:
    receiving the print request from the web client;
    requesting a new copy of the requested document from the web server; and
    sending the requested document to the printer.

7. The method as recited in claim 1 wherein the print server is the intermediate server and the method further comprises the steps of:
    caching the requested document at the intermediate server before modification;
    receiving the print request from the web client;
    retrieving the cached copy of the requested document; and
    sending the requested document to the printer.

8. The method as recited in claim 1 further comprising the steps of:
    determining web client information about the requesting web client;
    composing the markup language string according to the web client information.

9. The method as recited in claim 8 wherein the web client information includes a location of the web client and the print button contains a list of selectable printers chosen according to the web client location.

10. The method as recited in claim 9 wherein the web client information includes information on a web client display and the print button is chosen according to the display.

11. The method as recited in claim 1 wherein the parsing step includes the step of parsing for a blank space in the requested document and the markup language string is inserted in the blank space of the requested document.

12. The method as recited in claim 1 the parsing step includes the step of parsing for a border to the requested document and the markup language string is inserted at the border of the requested document.

13. The method as recited in claim 1 wherein the requested document is a web page in HTML.

14. A method for advertising a network service related to a document in a markup language, comprising the steps of:
   intercepting a document by an intermediate process, the document from a web server and directed to a web client;
   inserting a markup language string in the requested document for a button, including a path to a server providing a network service, to produce a modified document; and
   sending the modified document to the web client;
   so that when the modified document is presented at the web client on a display, the button is presented with the modified document.

15. The method as recited in claim 14 further comprising the steps of:
   responsive to selection of the button, sending a request to the server providing the network service; and
   providing the network service by the server.

16. The method as recited in claim 15 wherein the network service is printing the document at a printer associated with the server.

17. The method as recited in claim 15 wherein the button contains a list of selectable network services and further comprises the step of detecting which network service was selected by a user.

18. The method as recited in claim 14 wherein the inserted markup language string includes code for the appearance of the button and code for an action which results from activation of the button.

19. The method as recited in claim 14 wherein the intermediate process is resident at an intermediate server and the method further comprises the steps of:
   receiving the network service request from the web client;
   requesting a new copy of the document from the web server; and
   providing the network service with the new copy of the document.

20. The method as recited in claim 14 wherein the intermediate process is on an intermediate server and the method further comprises the steps of:
   caching the document at the intermediate server before modification;
   receiving the network service request from the web client;
   retrieving the cached copy of the document; and
   providing the network service using the cached copy of the document.

21. The method as recited in claim 14 further comprising the steps of:
   determining web client information about the web client;
   composing the markup language string according to the web client information.

22. The method as recited in claim 21 wherein the web client information includes a location of the web client and the button contains a list of network services and paths to servers providing those network services chosen according to the web client location.

23. The method as recited in claim 21 wherein the web client information includes information on a web client capabilities and the markup language for the button is chosen according to the web client capabilities.

24. The method as recited in claim 14 further comprising the steps of:
   parsing for a border to the document;
   inserting the markup language string at the border of the document.

25. The method as recited in claim 15 wherein the document is a web page in HTML and the method further comprises the steps of:
   issuing an HTTP request for the web page from the web client.

26. The method as recited in claim 14 wherein the intermediate process is an adjunct process to a browser application at the web client.

27. A network in which network services are provided to web clients by a server for documents in a markup language, comprising:
   communication means for passing data and requests throughout the network;
   a web client for requesting a document from a web server;
   an intermediate server for intercepting the requested document and inserting a markup language string in the requested document for a button to produce a modified document;
   a browser for presenting the modified document at the requesting client on a display and for detecting selection of the button, the browser sending a request for network services to a server listed in the inserted markup string; and
   a server for providing the network service for the requested document.

28. The network as recited in claim 27 further comprising a set of printers and wherein the button contains a list of selectable printers and the server provides printing services by printing the requested document on a selected printer.

29. The network as recited in claim 27 further comprising a facsimile service and wherein actuation of the button causes the requested document to be sent by facsimile to a requested destination.

30. The network as recited in claim 27 further comprising storage associated with a service and wherein actuation of the button causes the requested document to be archived in the storage.

31. The network as recited in claim 27 wherein the inserted markup language string includes code for the appearance of the print button and code for an action which results from activation of the print button.

32. The network as recited in claim 27 wherein the intermediate server has a cache for recently requested documents and upon receiving a request from a web client for a network service retrieves the cached copy of the requested document associated with the request.

33. The network as recited in claim 27 further comprising:
   means for determining web client information about the requesting web client;
   means for composing the markup language string according to the web client information.

34. A proxy server in a network for providing access to a network service related to a document in a markup language, comprising:
   means for intercepting requests and responses to and from a web server and a web client;
   means for inserting a markup language string in an intercepted document for a button, including instructions for accessing a network service, to produce a modified document; and means for sending the modified document to an intended recipient of the intercepted document;

so that when the modified document is presented on a display, the button is presented with the modified document.

35. The server as recited in claim 34 wherein the network service is printing the document at a printer associated with the server.

36. The server as recited in claim 34 wherein the button contains a list of selectable network services.

37. The server as recited in claim 34 further comprising a cache for caching recently intercepted documents.

38. The server as recited in claim 34 further comprising:

means for information about the intended recipient;

means for composing the markup language string according to the intended recipient information.

39. The server as recited in claim 38 wherein the intended recipient information includes a location of the intended recipient and the button contains a list of network services and paths to servers providing those network services chosen according to the location.

40. The server as recited in claim 38 wherein the intended recipient information includes information on intended recipient capabilities and the markup language string for the button is chosen according to the intended recipient capabilities.

41. A client system connectable to a network comprising:

a browser for requesting and presenting web documents on a client system display;

an interceptor for intercepting a requested document before reception by the browser;

an insertor for inserting a markup language string in the requested document to create a modified document, the markup language string for placing a button in the requested document which when activated will cause a request for a network service to be issued; and means for sending the modified document to the browser.

42. The client as recited in claim 41 wherein the network service is printing the requested document at a printer associated with the network.

43. The client as recited in claim 41 wherein the button contains a list of selectable network services.

44. The client as recited in claim 41 further comprising:

means for determining network service information including a list of selectable services in a network and a network path to each of a set of network service providers; and means for formatting the network service information into the markup language string so that the button includes the list of selectable services and selection of one of the services will cause a request to be issued to an appropriate network service provider.

45. The client as recited in claim 44 further comprising means for selecting which of the list of selectable services is to be formatted into the markup language string.

46. The client as recited in claim 44 further comprising wireless communication means to communicate with a network.

47. A computer program product in a computer readable medium for providing access to a network service related to a document in a markup language, comprising:

means for intercepting requests and responses to and from a web server and a web client;

means for inserting a markup language string in an intercepted document for a button, including instructions for accessing a network service, to produce a modified document; and means for sending the modified document to an intended recipient of the intercepted document;

so that when the modified document is presented on a display, the button is presented with the modified document.

48. The product as recited in claim 47 wherein the network service is printing the document at a printer associated with the server.

49. The product as recited in claim 47 further comprising means for routing a request for a network service receiving from the intended recipient, wherein the request was issued as a result of actuation of the button.

50. The product as recited in claim 47 further comprising means for caching recently intercepted documents.

51. The product as recited in claim 47 further comprising:

means for creating user profiles for a set of clients;

means for composing the markup language string according to user profile information for the intended recipient.

52. A computer program product in a computer readable medium for use with a browser for requesting and presenting web documents on a client system display comprising:

an interceptor for intercepting a requested document before reception by the browser;

an insertor for inserting a markup language string in the requested document to create a modified document, the markup language string for placing a button in the requested document which when activated will cause a request for a network service to be issued; and means for sending the modified document to the browser.

53. The product as recited in claim 52 wherein the network service is printing the requested document at a printer associated with the network.

54. The product as recited in claim 52 wherein the button contains a list of selectable network services.

55. The product as recited in claim 52 further comprising:

means for determining network service information including a list of selectable services in a network and a network path to each of a set of network service providers; and means for formatting the network service information into the markup language string so that the button includes the list of selectable services and selection of one of the services will cause a request to be issued to an appropriate network service provider.

56. The product as recited in claim 55 further comprising means for selecting which of the list of selectable services is to be formatted into the markup language string.

* * * * *